United States Patent [19]

Asfour

[11] Patent Number: 5,182,801
[45] Date of Patent: Jan. 26, 1993

[54] APPARATUS AND METHOD FOR PROVIDING FAST DATA TRANSFER BETWEEN MULTIPLE DEVICES THROUGH DYNAMIC RECONFIGURATION OF THE MEMORY SPACE OF THE DEVICES

[75] Inventor: Yousif R. Asfour, Boston, Mass.

[73] Assignee: Digital Equipment Corporation, Maynard, Mass.

[21] Appl. No.: 363,672

[22] Filed: Jun. 9, 1989

[51] Int. Cl.$^5$ .......................................... G06F 13/00
[52] U.S. Cl. ............................ 395/425; 364/DIG. 1; 364/228.1; 364/243; 364/243.1; 364/246; 364/246.1; 364/246.5
[58] Field of Search ... 364/200 MS File, 900 MS File; 395/425, 325, 200

[56] References Cited

U.S. PATENT DOCUMENTS

| 3,737,860 | 6/1973 | Sporer | 340/172.5 |
|---|---|---|---|
| 4,432,067 | 2/1984 | Nielsen | 364/900 |
| 4,473,877 | 9/1984 | Tulk | 364/200 |
| 4,485,457 | 11/1984 | Baloska et al. | 364/900 |
| 4,495,567 | 1/1985 | Treen | 364/200 |
| 4,691,280 | 9/1987 | Bennett | 364/200 |
| 4,783,731 | 11/1988 | Miyazaki et al. | 364/200 |
| 4,797,853 | 1/1989 | Savage et al. | 364/900 |
| 4,814,980 | 3/1989 | Peterson et al. | 364/200 |
| 4,881,164 | 11/1989 | Hailpern et al. | 395/425 |
| 5,056,000 | 10/1991 | Chang | 395/425 |
| 5,070,444 | 12/1991 | Kubo et al. | 395/425 |

Primary Examiner—Kevin A. Kriess
Attorney, Agent, or Firm—Kenyon & Kenyon

[57] ABSTRACT

A system for transferring data among the individual memory spaces of a plurality of devices. Each of the devices is independently coupled to a switch circuit. A pool of memory banks is also coupled to the switch circuit, such that each memory bank is independently coupled to the switch circuit. Control logic controls the switch circuit to provide changeable independent couplings between any of the memory banks and the devices. The memory space of a device is dynamically reconfigurable to include a memory bank only when that memory bank is coupled to the device by the switch circuit. Data can therefore be transferred between devices by recoupling a memory bank from one device to another device, so that the data in that memory bank is transferred from the memory space of one device to the memory space of the other device.

10 Claims, 6 Drawing Sheets

APPARATUS AND METHOD FOR PROVIDING FAST DATA TRANSFER BETWEEN MULTIPLE DEVICES THROUGH DYNAMIC RECONFIGURATION OF THE MEMORY SPACE OF THE DEVICES

FIELD OF THE INVENTION

The present invention relates to exchanging data between multiple devices in a computer system. More particularly, the invention relates to the exchange of data between multiple devices or computer systems at speeds which are independent of an individual device's data transfer rates or the size of the data being transferred.

BACKGROUND OF THE INVENTION

Data processing systems normally have several devices which move data from the memory space of one device to another (Each device can be a single component such as a CPU, or a complete system itself.) An example of such a system is a personal computer that has a data acquisition module, and a communication module both of which have direct memory access (DMA) capabilities. That system can be characterized as having three devices (the processor and the two modules) which transfer data between their respective memory spaces. (Memory space is the logical address space describing the memory locations in which a device can store and retrieve data.)

In one type of conventional approach, all the devices exchange information in the memory by sharing a common bus. A bus arbitration scheme allows the devices to access the memory over the bus only one device at a time. Hence, when one device is reading or writing information in memory, no other device can use the memory. For example, when these two devices, which do not share a common memory space, transfer data among themselves along the common bus, the transferring device reads the first byte from a data block from its memory space and then writes this byte into the receiving device's memory space over the common bus. This sequence of reading and then writing of bytes is repeated until all the data of the data block has been transferred. During this time however, no other device connected to the bus can use the bus for other transfers and have to wait for the bus to become free.

An alternative approach is to provide a multi-ported memory so that each device has an independent port through which it accesses the shared memory. Although this approach is an improvement upon the use of a common bus since each device can talk to a different piece of the memory independent of the others, all the devices still have to eventually connect through a common memory bus to the memory chips. In other words, the multi-ported memory approach operates similarly to the common bus system described above. A memory bus arbitration scheme is therefore still needed which effectively slows down the system by dividing access to the memory among the number of devices connected to the memory.

Furthermore, even within a single device such as a personal computer, transfers (or re-arrangements) in the device's own memory space can be a relatively long process. The transfer of data within a single device's memory space is typically performed by a MOVE application, in which a series of MOVE instructions read data from a data block in one part of a device's memory space, and write it to another part of the device's memory space.

Another data transfer problem arises in existing realtime application systems. In such systems, data is acquired at a much faster rate than it can be processed. Accordingly, the data has to be temporarily stored. Conventional approaches require the system to wait for data to be completely acquired into a system RAM (random access memory) before any device can use the system bus. Also, when the processing device is manipulating the data, the conventional system cannot receive more data. In other words, either data is being acquired into the system or is being processed, but both functions are not performed at the same time.

Other proposed systems use a cross-bar switch to provide individual connections between multiple processors and multiple memories. In these systems, the multiple memories can be considered to form a large memory having a single, unchanging memory space. In other words, the arrangement and size of the memory will stay the same, although the data stored in the memory may change. With such systems data is not transferred from the memory space of one device to the other, since the devices all share a common memory space. Therefore, each of the devices must be able to address the entire memory space.

A need exists for a method and apparatus that allow multiple devices to transfer data among themselves at the highest possible speed, as well as to move data blocks rapidly within a single device's own memory space. Also, the need exists for a system in which data can be acquired and processed at the same time.

SUMMARY OF THE INVENTION

The present invention provides a computer system that has a plurality of devices, such as processors, each of which is coupled independently to a switch circuit. At least one of these devices has a memory map. A plurality of memory banks are also independently coupled to the switch circuit. Control logic controls the switch circuit to provide changeable independent couplings between any of the memory banks and the devices. The memory map of at least one of the devices is dynamically reconfigurable to include one of the memory banks in its memory map only when that memory bank is coupled to the device.

The different devices in the system share a pool of memory banks. Data is transferred between the devices by swapping the memory banks into and out of the individual device's memory space, instead of moving the actual data. This provides the advantage that the number of devices which can share memory is only limited by the number of memory banks available, and not by the bandwidth of either the memory or the devices. Also, the speed of the transfer of data between devices is limited only by the speed with which devices can be switched to memory banks and not by the size of the data.

The arrangement of the invention allows large amounts of data to be effectively moved to different locations in the memory space of any device nearly instantaneously. It does so by changing a base address of a memory bank containing data. This avoids the time required to perform typical MOVE data block applications in which a MOVE instruction would have to be issued several times in succession to move a large block of data from one location to another location in a memory map.

The switching of the connections between the device and the memory banks can be combined with the changing of the base address of the memory bank such that the same data from the memory map of one device can be effectively moved to anywhere in another device's memory map nearly instantaneously. Again, the speed of the transfer is limited by the switching time, not by the memory bandwidth or by the data size.

An embodiment of the invention provides real-time applications in which the data is acquired and processed at the same time. In this embodiment, one of the devices is a data acquisition device that acquires data from the outside world. The data acquisition device and the processing device have independent paths to the memory banks. Because of these independent paths, data can be both acquired (by the data acquisition device) and processed (by the processing device) at the same time.

DETAILED DESCRIPTION

Figure 1:
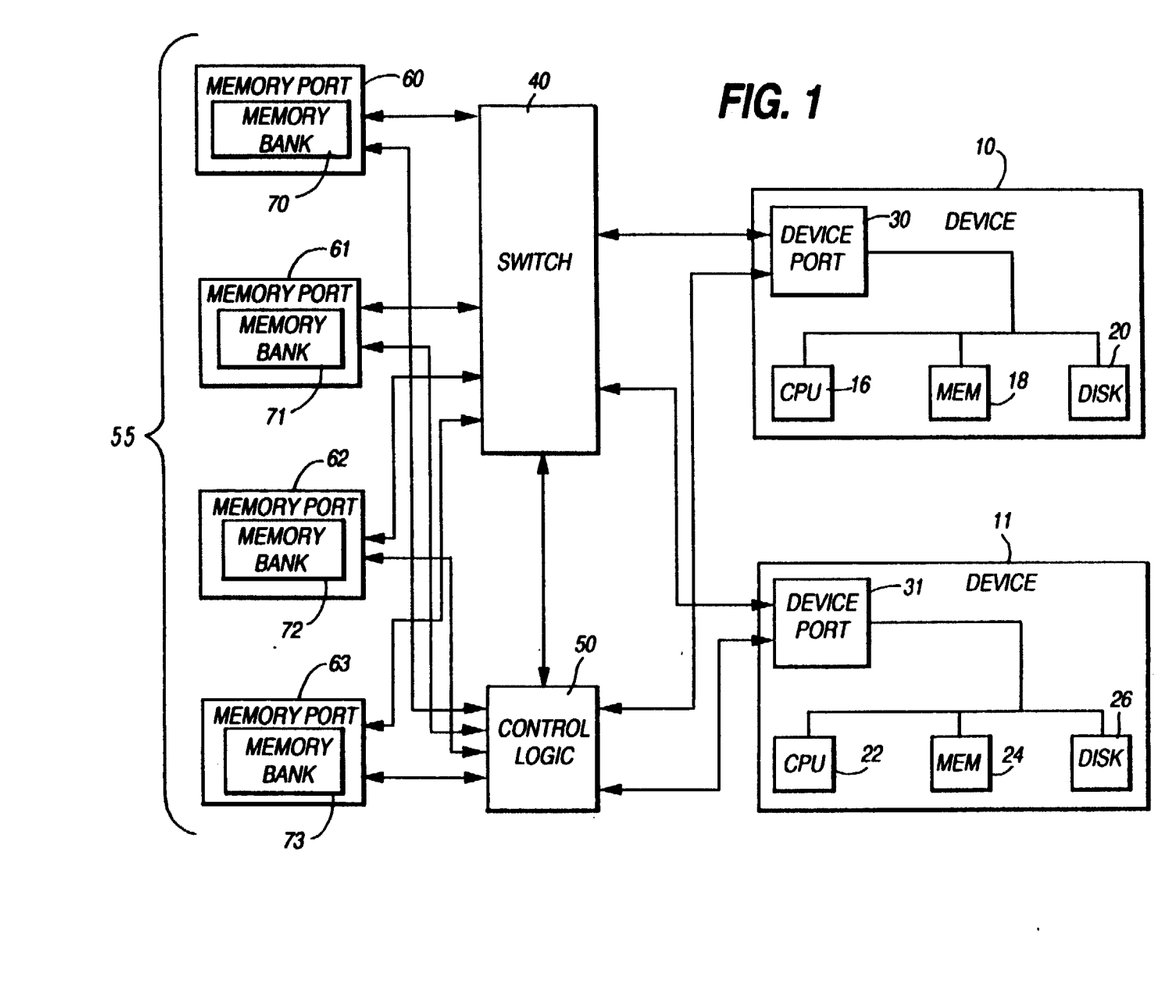
FIG. 1 shows a block diagram of a computer system construct accordance with an embodiment of the present invention.

A system constructed in accordance with an embodiment of the present invention is shown in FIG. 1 in block diagram form. The system includes two devices, a first device 10 and a second device 11. For example, device 10 may comprise CPU 16, memory 18 and disk drive 20, while device 11 may comprise CPU 22, memory 24 and disk drive 26.

The two devices 10, 11 have separate device ports 30, 31 that are devoted exclusively to the respective devices 10, 11. The device ports 30, 31 provide communication between the devices 10,11 and the rest of the system.

Each device port 30, 31 is separately and independently connected to both a switch circuit 40 and control logic 50. Under the direction of the control logic 50, the switch 40 establishes the actual connections between the devices 10, 11 and a memory pool 55.

The memory pool 55 is made up of a number of memory ports 60, 61, 62 and 63. Each of these memory ports 60-63 contains a single memory bank. Thus, memory port 60 contains memory bank 70, memory port 61 contains memory bank 71, memory port 62 contains memory bank 72 and memory port 63 contains memory bank 73.

Although FIG. 1 shows two devices that are connectable to any one of four memory ports, it should be recognized that any number of devices and memory ports can be used in this invention, limited only by the physical wiring complexity constraints.

A brief description of the operation of the invention now follows. For this example, assume that device 10 wants to send information to device 11. Device 10 will make a request to the control logic 50 for the use of a memory bank, for example, memory bank 70. Alternatively, the device 10 can simply request a transfer of information to the device 11, and the control logic 50 will assign an available memory bank to the device 10. If memory bank 70 is not currently being used, the control logic 50 will cause the switch 40 to make an actual connection between the device port 30 and memory port 60. Once this connection is made, the device 10 will load into the memory bank 70 the data which is to be transferred to device 11. It can do so because the memory bank 70 is in the memory space of device 10 once it is connected to the device 10. In order to reference memory addresses that are located in the memory bank 70, a base address for this bank 70 is provided by the device 10. This places the memory bank 70 within the memory space of device 10 at the specified base address.

Once the memory bank 70 is loaded with data from the device port 30, the control logic 50 will notify device 11 that device 10 is transferring information to it. The memory port 60 (and hence memory bank 70) will be disconnected from device port 30 and connected to device port 31. Once the connection between memory bank 70 and device 11 has been made through switch 40, the device 11 can access the data from the memory bank 70 whenever it desires to do so. In other words, the memory bank 70 is now within the memory space of device 11 at the location specified by the base address of that bank 70. As earlier, the device 11 will provide a specified base address to the memory bank 70.

It should be recognized that device 10 can load any one of the memory banks 71, 72 or 73 at the same time that device port 31 is connected to memory bank 70, since a single device can be connected to more than one memory bank at a time. Thus, at the same time that device 11 is accessing the data from the memory bank 70, device 10 can be communicating with memory banks 71, 72 or 73.

An advantage to the system shown in FIG. 1 is the nearly instantaneous transfer of data from one device to another device. A transfer of data from one device to the other device is made by simply "flipping" a switch so that the memory bank will be connected to the receiving device instead of the transmitting device. This changing of connections between memory banks and devices dynamically reconfigures the memory spaces of the devices. Further applications of the invention will be described later.

Figure 2:
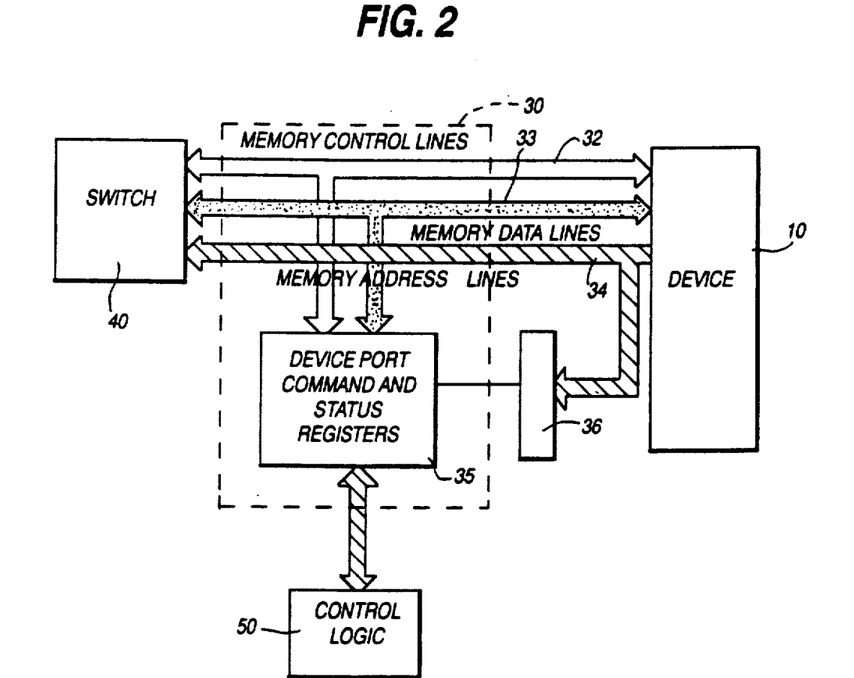
FIG. 2 shows a block diagram of a device port used in the embodiment of FIG. 1

An exemplary embodiment of a device port 30 is illustrated in block diagram form in FIG. 2. Each device in the system has its own device port that is separately connected to the switch 40. As seen in FIG. 2, device port 30 has memory control lines 32, memory data lines 33 and memory address lines 34 that connect a single device 10 to the switch 40. In addition to providing the communication from the device 10 to the switch 40 (and hence to the memory banks 70-73), the device port 30 has a set of command and status registers 35. These command and status registers 35 are coupled to the memory control lines 32 and the memory data lines 33. The command and status registers 35 are needed to communicate with the control logic 50 in order for the device 10 to issue memory bank connection and release requests, as well as to ask for and receive memory pool status information. Conventional registers can be used for the port command and status registers 35. An exemplary set of commands is set forth below in Table 1, while an exemplary set of status information is set forth in Table 2.

TABLE 1

| Device Requests | |
|---|---|
| REQUEST | DESCRIPTION |
| Unused Bank Request | The device requests any available memory bank to be mapped into a specific location of the device's own memory space. |
| Highest Priority Request | The device requests the memory bank that has the needed data with the highest priority. |
| Bank from Device | A request for a memory bank with data from a specified device in the system. |
| Send to Device | A request to reassign a particular memory bank to another device in a specified location. |

TABLE 2

| Status Information | |
|---|---|
| STATUS | DESCRIPTION |
| No Such Bank | The device request is not honored, either because all memory banks are already attached to the other devices, or because the specified memory bank is not available. |
| Bank Attached | The control logic established a connection with a memory bank, and the connection is valid. |
| Bank Reassigned | Informs the requesting device that the request to send has been honored. |
| Bank Pending | A memory bank with data is queued for the device. |

The memory address lines 34 are also coupled to an address decoder 36. Decoded memory addresses are provided by the address decoder to the port command and status registers 35. As stated before, the device ports 30,31 provide each of the devices with an independent path to the switch 40.

A number of different embodiments of the switch 40 are contemplated. Two characteristics of the switch 40 that are required are as follows. Once a connection has been established between a device 10 and a memory bank 70 in the memory pool 55, the memory bank 70 is required to be logically isolated from the other devices 11 and memory banks 71-73. The second requirement is that the switch be "transparent" to uni-directional as well as bi-directional signals. This means that if discrete logic chips are used for the implementation of the switch, the direction of the buffers should reflect the needs of a read, or a write cycle. Such switches can be implemented in different ways, either using standard off the shelf parts, or customized chips.

Figure 3:
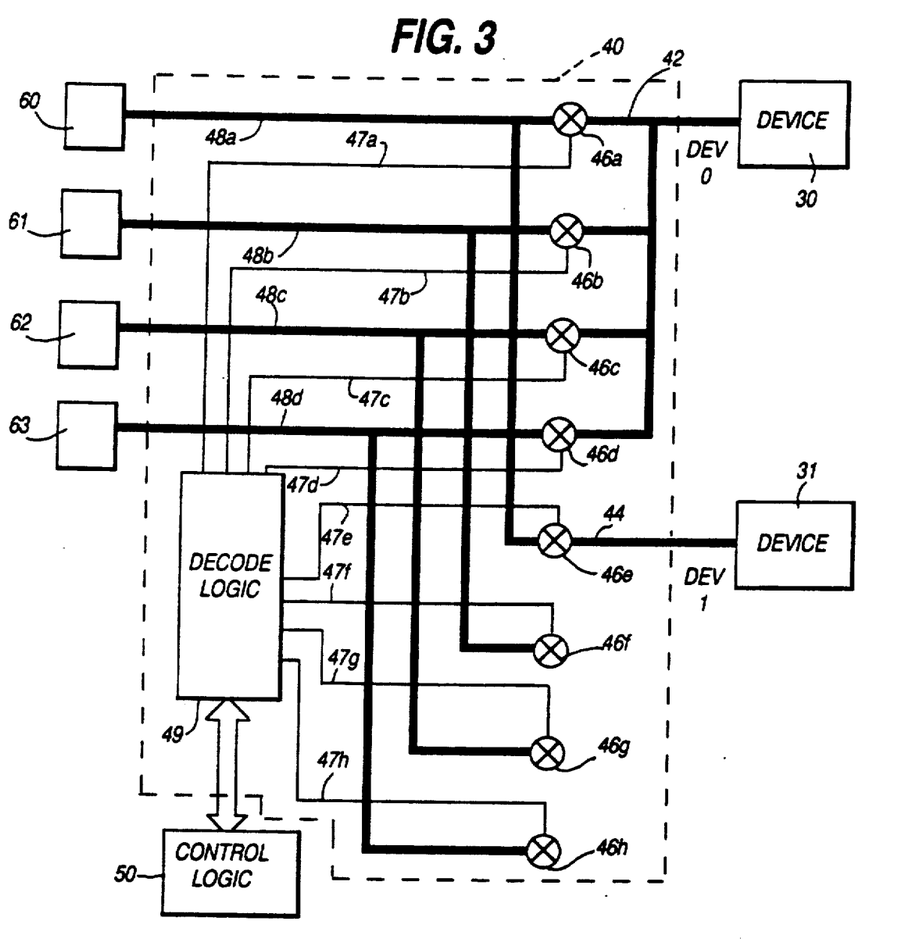
FIG. 3 illustrates an exemplary embodiment of a bilateral analog switch usable as the switch in the embodiment of a system of FIG. 1.
Figure 4:
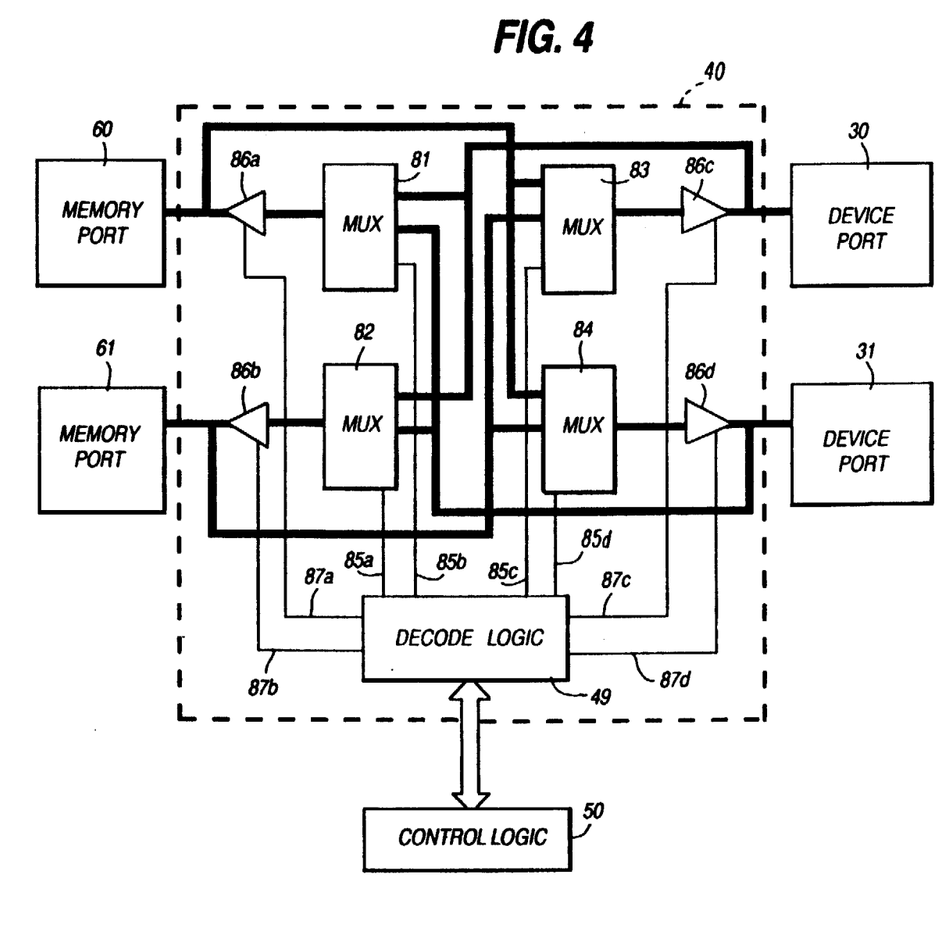
FIG. 4 illustrates a multiplex switch usable as the switch in the embodiment of FIG. 1.

Two examples of the switch 40 are shown in FIGS. 3 and 4. In FIG. 3, a bi-lateral switch is shown. Switch 40 has an input/output line 42 coupled to device port 30, and a separate input/output line 44 coupled to device port 31. The input/output line 42 for device port 30 is coupled to four bi-lateral switches 46a, 46b, 46c and 46d.

Input/output line 44 and data port 31 is coupled to each of four bi-lateral switches 46e, 46f, 46g and 46h.

The term bi-lateral means that the switches 46a–46h are bi-directional by design so that depending upon their position, they will allow communication between a device port and a memory in one switch position, and will prevent communication between the memory port and the device port in another switch position. One switch from each of the two sets of switches is coupled to memory port connection line 48a, 48b, 48c, or 48d. Thus, the switches 46a and 46e operate to couple either device port 30 or device port 31 to memory port 60 through memory port connection line 48a. Also, switch 46a can be switched so that neither device port 30 nor 31 will be connected to memory port 60. The logic of the switch 40 is such that there is no direct communication between the individual memory ports 60-63 or between the devices 10 and 11.

The switches 46a–46h are controlled by control signals sent over switch control lines 47a, 47b, 47c, 47d, 47e, 47f, 47g and 47h. The switch control signals are generated by a decode logic 49 that is itself controlled by signals from the control logic 50. Standard decoding logic is used to determine the various switch positions based upon the control signal from control logic 50. It should be apparent from the above description that switch 40 can connect either device port 30 or 31 to any one or all of the memory ports 60-63.

Another example of a switch 40 is shown in FIG. 4. This embodiment of the switch 40 uses multiplexers 81-84 and tri-state buffers 86a-86d to effect the switching logic. For clarity of illustration, the connections for only two memory ports 60, 61 are shown in FIG. 4. The additional logic needed to couple two or more memory ports 62, 63 is easily accomplished by one of ordinary skill in the art. As in FIG. 3, the decode logic 49 is used to decode control signals from control logic 50. It decodes these signals and sends out control signals to the multiplexer 81-84 over respective control lines 8a-85d. The decode logic 49 also sends out control signals to the tri-state buffers 86a-86d over respective control lines 87a-87d. Appropriate control signals applied to the multiplexed and the tri-state buffers will cause a device port 30 or 31 to be connected to any or all of the memory ports 60, 61.

An advantage of the embodiment of FIG. 4 over the bi-lateral switch of FIG. 3 is that it more readily lends itself to implementation using gate arrays. For example, the embodiment of FIG. 4 uses standard discrete logic chips to switch between the two device ports 30, 31 and the two memory ports 60, 61. It should be noted that since logic devices are uni-directional by nature, additional logic is needed to control the direction of the tri-state buffers of the multiplexers 81-84 for read and for write cycles.

The two examples of the switch 40 described above both provide independent connections between the device ports 30, 31 and the memory ports 60-63 so that any device 10 or 11 can be coupled to any or all of the memory banks 70-73.

Figure 5:
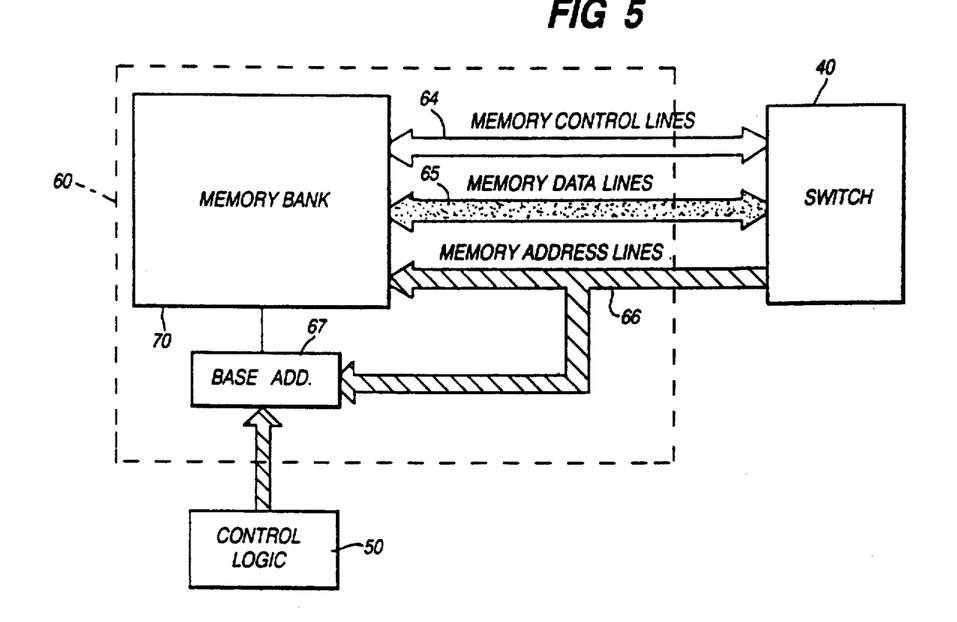
FIG. 5 shows a block diagram of a memory port used in the embodiment of the system of FIG. 1.

A typical memory port 60 is illustrated in block diagram form in FIG. 5. The memory port 60 is coupled to the switch 40 via memory control lines 64, memory data lines 65 and memory address lines 66. Although the data and address lines 65, 66 are shown in FIG. 5 as two separate lines, these could be replaced with a single time multiplexed DAL bus. The control, data and address lines 64, 65 and 66 connect the switch 40 to the memory bank 70.

The memory port 60 also has a base address register 67 that is programmable by the control logic 50. By changing the base address of a specific memory bank, such as memory bank 70, the control logic 50 can effectively move bank-sized data blocks within one processor's memory space almost instantaneously. This allows the control logic 50 to place the memory bank 70 anywhere within the selected device's memory space. A more complete explanation of this process follows.

Assume that device 10 has a memory address space of 0-1000. Also, assume that the memory bank 70 has 100 memory addresses, 0-99. When the device 10 is coupled to the memory bank 70 having 100 memory addresses, the device 10 will specify the base address of the memory bank. This places the memory bank anywhere in the memory space of the device 10. For example, device 10 can place the 100 memory addresses of the memory bank 70 in its memory space at locations 500-599. It does this by causing the base address of the memory bank 70 to be 500. The device 10 could just as easily place or move the base address of the memory bank to another address in its memory space, such as address 550.

To move the data in the memory bank 70 to a different location in its memory space, the device 10 simply causes the base address of the memory bank 70 to be changed from 500 to, for example, 800. The memory bank will then be located in the memory space of device 10 at locations 800-899. This movement of the data in the memory space of device 10 is nearly instantaneous. It only requires the changing of the base address of the memory bank, rather than the actual movement of data between locations in successive instructions in the memory of device 10, as performed in a typical MOVE application.

In the above description, it is apparent that a device 10 or 11 can place a memory bank anywhere within its memory space by simply changing the base address of the memory bank. Therefore, if it is advantageous for device 10 to always write to location 100, the base address of the memory bank 70 can be specified to be 100 when the memory bank 70 is connected to the device 10. Similarly, if it is advantageous for device 11 to always write to location 700 in its memory map, it can change the base address of the same memory bank 70 to 700 when that memory bank is connected to device 11. This provides great flexibility in memory mapping of the memory spaces of the device of the system.

The memory banks 70-73 can be any convenient size, such as 16 bits wide by 64K addresses deep. One convenient size is that of an ordinary data packet, since many devices are already designed to handle data in packet-sizes.

The control logic 50 can be a standard microprocessor. The basic functions of the control logic 50 are as follows. The control logic 50 monitors the requests from the devices 10,11. It queues the device requests for the memory banks 70-73. Control logic 50 provides the devices 10,11 with requested status information. The control logic 50 also controls the switch 40 and the memory bank base addresses. Finally, it maintains information on the contents, ownership, and assignments of the various memory banks 70-73 in the memory pool 55.

There are several requests or command types that devices 10,11 can initiate. Examples of these were already described in Table 1.

Upon receiving requests or command from a device 10 or 11, the control logic 50 searches for the requested memory bank, for example memory bank 73. The control logic 50 updates the base address and the switch 40 to place memory bank 73 in the requested location of the requesting device's memory space, as described earlier. At this time, both the "transmitting" and "receiving" devices 10 and 11, are informed of the updated memory pool status by writing to the device's 10,11 port status registers 35.

Figure 6:
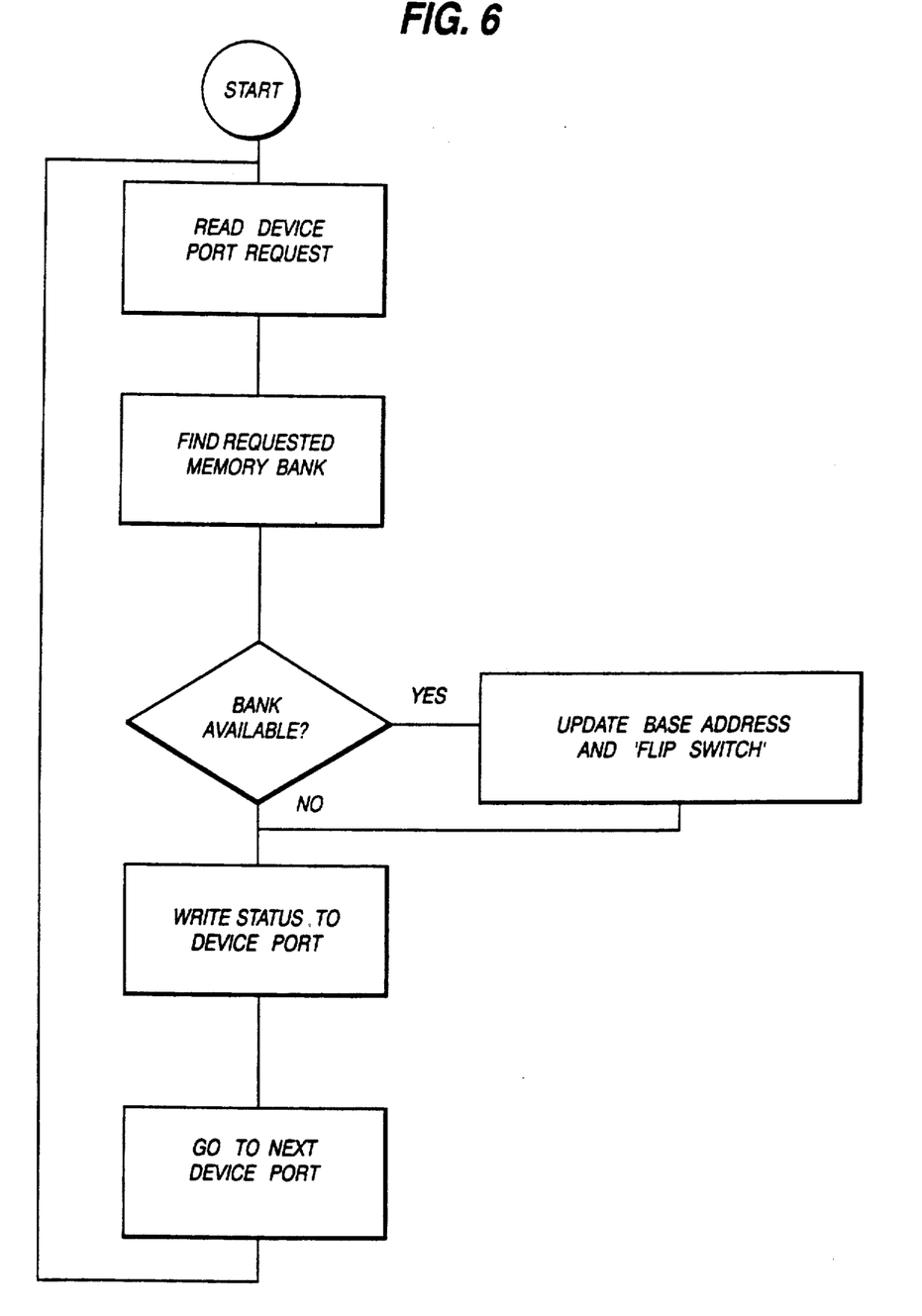
FIG. 6 is a diagram illustrating an example of a flow of control followed by the control logic of the embodiment of FIG. 1 to monitor the control registers of the device port of FIG. 2.

The control logic 50 also must arbitrate the requests of all the devices 10,11 in the system. One way is to implement the control logic 50 with a microprocessor that runs a routine which monitors all the control registers 35 of all the device ports 30,31 in a "round robin" fashion. FIG. 6 illustrates a flow diagram of such a routine. This algorithm ensures fair arbitration between the various device ports 30,31. The method also guarantees a predetermined latency period, since the time to service a particular device is constant. The latency period is the time required to service a particular device.

An alternative approach to arbitration would be to cause the control registers 35 of each device port 30,31 to interrupt the control logic 50 every time a device 10,11 has a request. The control logic 50 could then process the device's 10,11 interrupt according to an interrupt priority scheme. Instead of a microprocessor, a state machine which performs the same functionality as described above could be used, as well as other means of arbitration.

Two types of operation which can be performed by the present invention have already been described. One is the transfer of data from one device 10 to another device 11 through the change in the connections of the memory bank from one device 10 to the other device 11. Also discussed was a movement of a memory bank within the memory space of a single device 10, so as to dynamically reconfigure the device's memory space. This was performed by changing the base address of the memory bank 70 to which a device 10 is already connected. However, the transferring of the connection of the memory bank from one device 10 to another device 11 can be combined with the changing of the base address of the memory bank 70, so that the receiving device 11 will place the data from the memory bank 70 to a desired location in its own memory space. The memory spaces of both of the devices 10, 11 will be changed by such an operation.

Figure 7:
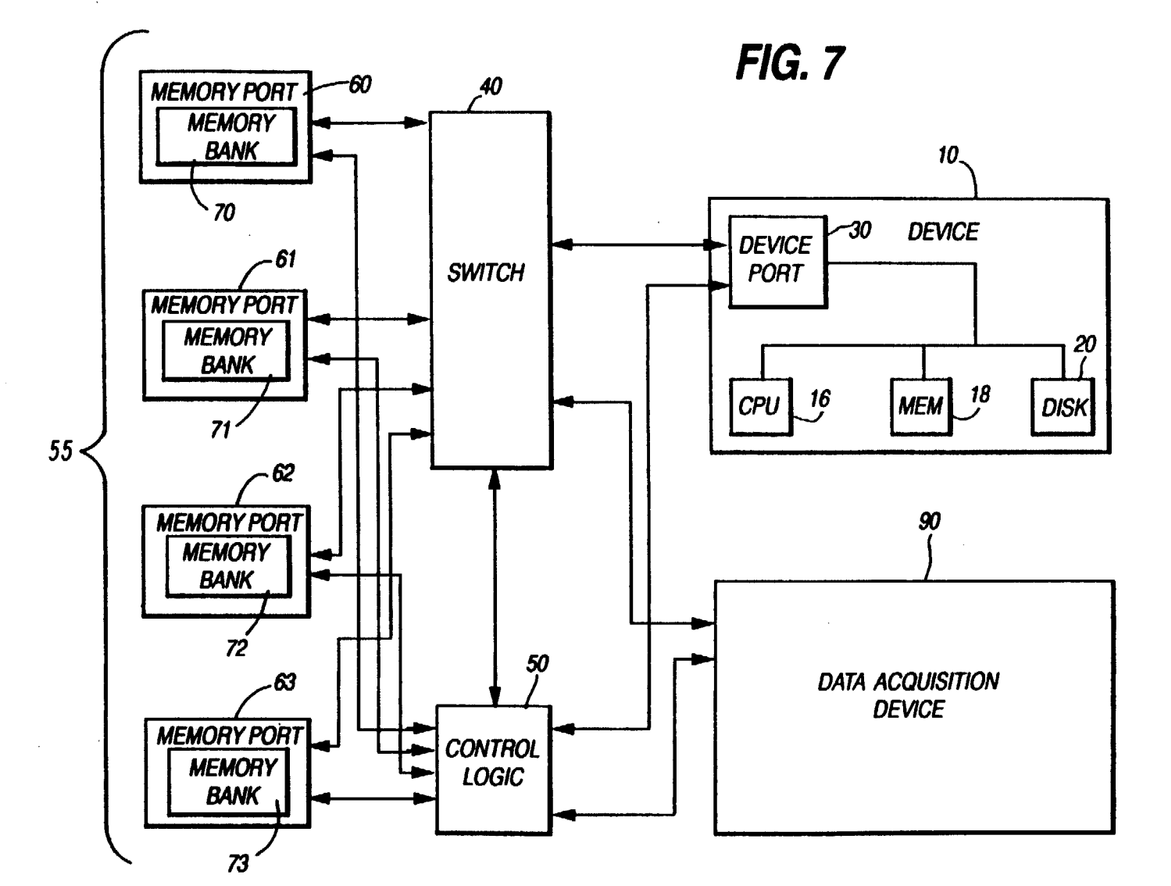
FIG. 7 illustrates an embodiment of the present invention having a data acquisition module that acquires data for the system.

The present invention also finds utility in fast data acquisition for a relatively slower processor. This is illustrated in FIG. 7, which shows the embodiment of FIG. 1, but with a data acquisition device 90 coupled to the switch 40.

It is known that some communication and real time applications receive data much faster than a processor, such as device 10, can handle. Conventional approaches require the system to wait for data to be completely acquired into a system RAM before any device can use the system bus. Conversely, when the processing device is manipulating the data, the conventional system cannot receive more data from the outside world.

The present invention solves this problem since data can be acquired and stored in a memory bank 70-73 at the same time as other data is being processed by the device 10 or device 11. This is possible because of the separate buses for the data acquisition device 90 and the device 10.

In operation, the data acquisition device 90 will load memory bank after memory bank, as it acquires data. As one memory bank 70 is filled, the data acquisition device 90 will be connected to a different memory bank 71 so that it can load that memory bank. The processing device 10 will be connected to the memory bank 70 after the memory bank 70 has been filled by the data acquisition device 90. The device 10 can then process the information in the memory bank 70 at its own speed. On the other hand, the data acquisition device 90 can acquire data at a much faster pace and load the remaining memory banks 71-73 while the device 10 is operating on the data in the first memory bank 70 that was filled. When the system is provided with several memory banks, very large bursts of data can be acquired, while allowing the device 10 to process smaller portions of data.

What is claimed is:

1. A computer system, comprising:
   a switch circuit;
   a plurality of devices, each of said devices being independently coupled to said switch circuit, at least a first one of said devices having a memory space;
   a plurality of memory banks, each of said memory banks being independently coupled to said switch circuit; and
   control logic coupled to said switch circuit, said control logic controlling said switch circuit to provide changeable independent couplings between any of said memory banks and any of said devices, said control logic operating to dynamically reconfigure the memory space of said first device, said any of said memory banks being included in the memory space of said first device only when said any of said memory banks is coupled to said first device via said switch circuit.

2. The system of claim 1, further comprising a plurality of memory ports coupled between said memory banks and said switch, each said memory port providing at least one memory coupling path that carry signals between said switch and a different one of said memory banks.

3. The system of claim 2, wherein each memory port has a plurality of said memory coupling paths, a first of said memory coupling paths carrying memory control signals, a second of said memory coupling paths carrying memory data signals, and a third of said memory coupling paths carrying memory address signals.

4. The system of claim 3, wherein each memory port includes a base address register coupled between the memory bank and the control logic, said base address register dynamically storing a base address of the memory bank.

5. The system of claim 1, further comprising a plurality of device ports coupled between said devices and said switch, each said device port providing at least one device coupling path that carry signals between said switch and a different one of said devices.

6. The system of claim 5, wherein each device port has a plurality of said device coupling paths, a first of said device coupling paths carrying memory control signals, a second of said device coupling paths carrying memory data signals, and a third of said memory coupling paths carrying memory address signals.

7. A method of transferring data between devices in a computer system having a plurality of devices comprising:
   a) coupling a first device to a memory bank;
   b) reconfiguring a memory space of said first device, such that the first device's memory space includes said memory bank when coupled to said memory bank;
   c) decoupling said first device from said memory bank;
   d) reconfiguring said first device's memory space so as not to include said memory bank when decoupled from said memory bank;
   e) coupling a second device to said memory bank; and
   f) reconfiguring a memory space of said second device, such that the second device's memory space includes said memory bank when coupled to said memory bank.

8. A method of acquiring data at one rate and processing data at another rate in a computer system comprising:
   a) dynamically coupling a data acquisition device to a plurality of memory banks;
   b) operating said data acquisition device to sequentially load said memory banks at a first rate;
   c) decoupling said data acquisition device from a first memory bank when said first memory bank is filled by said data acquisition device;
   d) coupling said first memory bank to a processing device which processes data at a second rate;
   e) controlling said first memory bank to reconfigure a memory space of said processing device such that said processing device's memory space includes said first memory bank; and
   f) operating said processing device to process said data at said second rate.

9. The method of claim 8, wherein said second rate is slower than said first rate.

10. The method of claim 8, further comprising the steps of:
   g) decoupling the remaining memory banks from said data acquisition device as each remaining memory bank is loaded with data;
   h) performing the sequence of coupling one of the remaining memory banks that has been loaded with data to said processing device, and operating said device to process said data at said second rate until all of the data in said one of the remaining memory banks is processed;
   i) controlling each of the remaining memory banks to reconfigure the memory space of the processing device such that each of the remaining memory banks is including in the memory space of the processing device, as the remaining memory banks are coupled to said processing device; and
   j) repeating steps h) and i) for each of the memory banks in the computer system that have been loaded by said data acquisition device, until all of said data has been processed.

* * * * *